(12) United States Patent
Christensen et al.

(10) Patent No.: US 6,381,567 B1
(45) Date of Patent: Apr. 30, 2002

(54) METHOD AND SYSTEM FOR PROVIDING REAL-TIME PERSONALIZATION FOR WEB-BROWSER-BASED APPLICATIONS

(75) Inventors: Carol Sue Christensen; Robert Kimberlin Foster; David Marshall Perlsweig; Richard Dennis Talbot; Mark Allen Wieland, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/810,784

(22) Filed: Mar. 5, 1997

(51) Int. Cl.⁷ .............................................. G06F 17/20
(52) U.S. Cl. ....................................................... 704/8
(58) Field of Search ................... 704/1, 8, 10; 707/500, 707/501, 513; 395/200.33, 200.48; 345/866, 835

(56) References Cited

U.S. PATENT DOCUMENTS

| | | | | |
|---|---|---|---|---|
| 4,566,078 A | * | 1/1986 | Crabtree | 704/1 |
| 4,595,980 A | * | 6/1986 | Innes | 704/8 |
| 4,615,002 A | * | 9/1986 | Innes | 704/8 |
| 5,127,748 A | * | 7/1992 | Okimoto et al. | 704/8 |
| 5,195,034 A | * | 3/1993 | Garneau et al. | 704/8 |
| 5,251,130 A | * | 10/1993 | Andrews et al. | 704/3 |
| 5,307,265 A | * | 4/1994 | Winans | 704/8 |
| 5,416,903 A | * | 5/1995 | Malcolm | 704/2 |
| 5,434,776 A | * | 7/1995 | Jain | 704/1 |
| 5,499,335 A | * | 3/1996 | Silver et al. | 704/2 |
| 5,583,761 A | * | 12/1996 | Chou | 704/8 |
| 5,664,206 A | * | 9/1997 | Murow et al. | 704/8 |
| 5,675,818 A | * | 10/1997 | Kennedy | 704/8 |
| 5,678,039 A | * | 10/1997 | Hinks et al. | 704/8 |

OTHER PUBLICATIONS

William S. Hall, "Adapt Your Program For Worldwide Use WithWindows International Support", Microsoft Systems Journal, Nov./Dec. 1991, pp. 29–58.*

Cowart, Robert. "Mastering Windows 3.1", 1992, pp. 175–177.*

"Multilingualism and the Internet," by WorldWide Language Institute, 1995, 1996—Document update: Oct. 5, 1996 (http://wwli.com).

"Apache Content Negotiation" (Dec. 22, 1996) (http://www.apache.org/docs/content-negotiation.html).

"Accent delivers multilingual technology to the Internet" (Dec. 22, 1996) (http://www.accentsoft.com/press/inet2.html).

"Universal Language Support on the Internet" (Dec. 22, 1996) (http://www.gammapro.com/release2.html).

"Arabic accent" (Dec. 22, 1996) Copyright 1995 CNME (http://www.gpg.com/cnme/0396/file3.html).

"Accent Software and Spyglass Inc. join to produce a multilingual Internet browser"—Document update Jul. 1, 1996—Copyright 1996 Accent Software (http://www.accentsoft.com/press/spyglass.html).

* cited by examiner

Primary Examiner—Patrick N. Edouard
(74) Attorney, Agent, or Firm—Volel Emile; Bracewell & Patterson, L.L.P.

(57) ABSTRACT

A method and system for personalizing standard data-processing applications for utilization by diverse data-processing application users. Initially, data which includes a group of human language files, is stored within a source directory within a data-processing system. Next, the presence of the group of human language files is automatically detected within the source directory in response to loading general system data into a working directory wherein at least one human language file among the group of human language files corresponds to a preset human language setting for the data-processing system. Thereafter, the human language file which corresponds to the preset human language setting is loaded into the working directory from the source directory. Next, the general system data is configured with the human language file which corresponds to the preset human language setting such that the general system data is now personalized to the human language of the user of the data-processing system. The data can include hyper-text data for utilization in data-processing applications such as internet-based web browsers.

6 Claims, 5 Drawing Sheets

METHOD AND SYSTEM FOR PROVIDING REAL-TIME PERSONALIZATION FOR WEB-BROWSER-BASED APPLICATIONS

BACKGROUND OF THE INVENTION

1. Technical Field

The present invention relates to information retrieval in data-processing systems. In particular, the present invention relates to data-processing systems which are linked to other data-processing systems by an associated linking network. More particularly, the present invention relates to associated networks which utilize mark-up languages. Still more particularly, the present invention relates to a method and system for providing, via a mark-up language medium, personalized data-processing applications for utilization by data-processing users.

2. Description of the Related Art

The development of computerized information resources, such as the "intenet" and the proliferation of "web" browsers allow users of data-processing systems to link with other servers and networks, and thus retrieve vast amounts of electronic information heretofore unavailable in an electronic medium. Such electronic information is increasingly displacing more conventional means of information transmission, such as newspapers, magazines, and even television. In communications, a set of computer networks which are possibly dissimilar from one another are joined together by "gateways" that handle data transfer and the conversion of messages from the sending network to the protocols utilized by the receiving network, with packets if necessary. A gateway is a device used to connect dissimilar networks (i.e., networks utilizing different communication protocols) so that electronic information can be passed from one network to the other. Gateways transfer electronic information, converting such information to a form compatible with the protocols used by the second network for transport and delivery. The term "internet" is an abbreviation for "internetwork," and refers commonly to the collection of networks and gateways that utilize the TCP/IP suite of protocols, which are well-known in the art of computer networking. TCP/IP is an acronym for "Transport Control Protocol/Interface Program," a software protocol developed by the Department of Defense for communication between computers.

Electronic information transferred between data-processing networks is usually presented in hyper-text, a metaphor for presenting information in a manner in which text, images, sounds, and actions become linked together in a complex non-sequential web of associations that permit the user to "browse" through related topics, regardless of the presented order of the topics. These links are often established by both the author of a hyper-text document and by the user, depending on the intent of the hyper-text document. For example, traveling among links to the word "iron" in an article displayed within a graphical user interface in a data-processing system might lead the user to the periodic table of the chemical elements (i.e., linked by the word "iron"), or to a reference to the use of iron in weapons in Europe in the Dark Ages. The term "hyper-text" was coined in the 1960s to describe documents, as presented by a computer, that express the nonlinear structure of ideas, as opposed to the linear format of books, film, and speech.

The term "hyper-media," on the other hand, more recently introduced, is nearly synonymous with "hyper-text" but focuses on the nontextual components of hyper-text, such as animation, recorded sound, and video. Hyper-media is the integration of graphics, sound, video, or any combination into a primarily associative system of information storage and retrieval. Hyper-media, as well as hyper-text, especially in an interactive format where choices are controlled by the user, is structured around the idea of offering a working and learning environment that parallels human thinking—that is, an environment that allows the user to make associations between topics rather than move sequentially from one to the next, as in an alphabetic list. Hyper-media, as well as hyper-text topics, are thus linked in a manner that allows the user to jump from one subject to other related subjects during a search for information. Hyper-link information, such as "World Wide Web" address sites, are contained within hyper-media and hyper-text documents, which allow a user to go back to the "original" or referring Web site by the mere "click" (i.e., with a mouse or other pointing device) of the hyper-linked topic.

A typical networked system which utilizes hyper-text and hyper-media conventions follows a client/server architecture. The "client" is a member of a class or group that uses the services of another class or group to which it is not related. Thus, in computing, a client is a process (i.e., roughly a program or task) that requests a service provided by another program. The client process utilizes the requested service without having to "know" any working details about the other program or the service itself. Thus, in a client/server architecture, particularly a networked system, a client is usually a computer that accesses shared network resources provided by another computer (i.e., a server).

In such a client/server architecture, a request by a user for news can be sent by a client application program to a server. Such a server is typically a remote computer system accessible over the Internet or other communication medium. The server scans and searches for raw (e.g., unprocessed) information sources (e.g., newswire feeds or newsgroups). Based upon such requests by the user, the server presents filtered electronic information as server responses to the client process. The client process may be active in a first computer system, and the server process may be active in a second computer system, and communicate with one another over a communication medium, thus providing distributed functionality and allowing multiple clients to take advantage of the information-gathering capabilities of the server.

Client and server can communicate with one another utilizing the functionality provided by Hyper-Text Transfer Protocol (HTTP). The world wide web (WWW) or, simply, the web, includes all the servers adhering to this standard which are accessible to clients via Uniform Resource Locators (URLs). For example, communication can be provided over a communications medium. In particular, the client and server may be coupled to one another via Serial Line Internet Protocol (SLIP) or TCP/IP connections for high-capacity communication. Active within the client is a first process, known as a "browser," which establishes the connection with the server and presents information to the user. The server itself executes corresponding server software which presents information to the client in the form of HTTP responses. The HTTP responses correspond to web "pages" constructed from a Hyper-Text Markup Language (HTML), or other server-generated data.

The client and server typically display browsers and other internet data for a user via a graphical user interface. A graphical user interface is a type of display format that enables a user to choose commands, start programs, and see lists of files and other options by pointing to pictorial representations (icons) and lists of menu items on the screen. Choices can generally be activated either with a keyboard or a mouse.

Many software developers are utilizing the convenience and flexibility of standard web browsers to develop new user interfaces for their products. Although convenient and flexible, this new and evolving HTML programming lacks many of the programming tools and techniques for developing applications for complex programming or user environments.

The popularity of the world wide web has also created a tremendous focus on the HTML programming environment for many different types of applications. Although generally available software application development tools have evolved considerably in the last few years, the HTML programming language is still basically a crude, tag-oriented, word-processing type of environment. Applications developers are either forced to create alternatives or resort to the use of more complex application programming languages such as JAVA, ActiveX, and so forth, which are well-known in the art of computer programming.

Because the world wide web is currently breaking national borders due to the proliferation of client/server systems throughout the world, individuals utilizing different national languages are faced with human language barriers when accessing and downloading applications via web-browser-based applications. For example, a developer of a web-browser-based application with a requirement to support world wide distribution in foreign languages, with specific content for each country and each host system, is faced with the problem of providing multiple copies of such applications in different languages. A need thus exists for a method and system which provides personalized mark-up language-based data-processing applications to users located in different countries. Such a method and system could be particularly tailored to the language and country of the user.

SUMMARY OF THE INVENTION

It is therefore an object of the invention to provide for information retrieval methods in data-processing systems.

It is another object of the invention to provide methods and systems which can be utilized with data-processing systems linked to other data-processing systems by associated linking networks.

It is still another object of the invention to provide a method and system which allows hyper-link information utilized in data-processing system networks to be retained in a printable medium.

A method and system for personalizing standard data-processing applications for utilization by diverse data-processing application users is presented. Initially, data which includes a group of human language files is stored within a source directory within a data-processing system. Next, the presence of the group of human language files is automatically detected within the source directory in response to loading general system data into a working directory, wherein at least one human language file among the group of human language files corresponds to a preset human language setting for the data-processing system. Thereafter, the human language file which corresponds to the preset human language setting is loaded into the working directory from the source directory. Next, the general system data is configured with the human language file which corresponds to the preset human language setting such that the general system data is now personalized to the human language of the user of the data-processing system. The data can include hyper-text data for utilization in data-processing applications such as internet-based web browsers.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
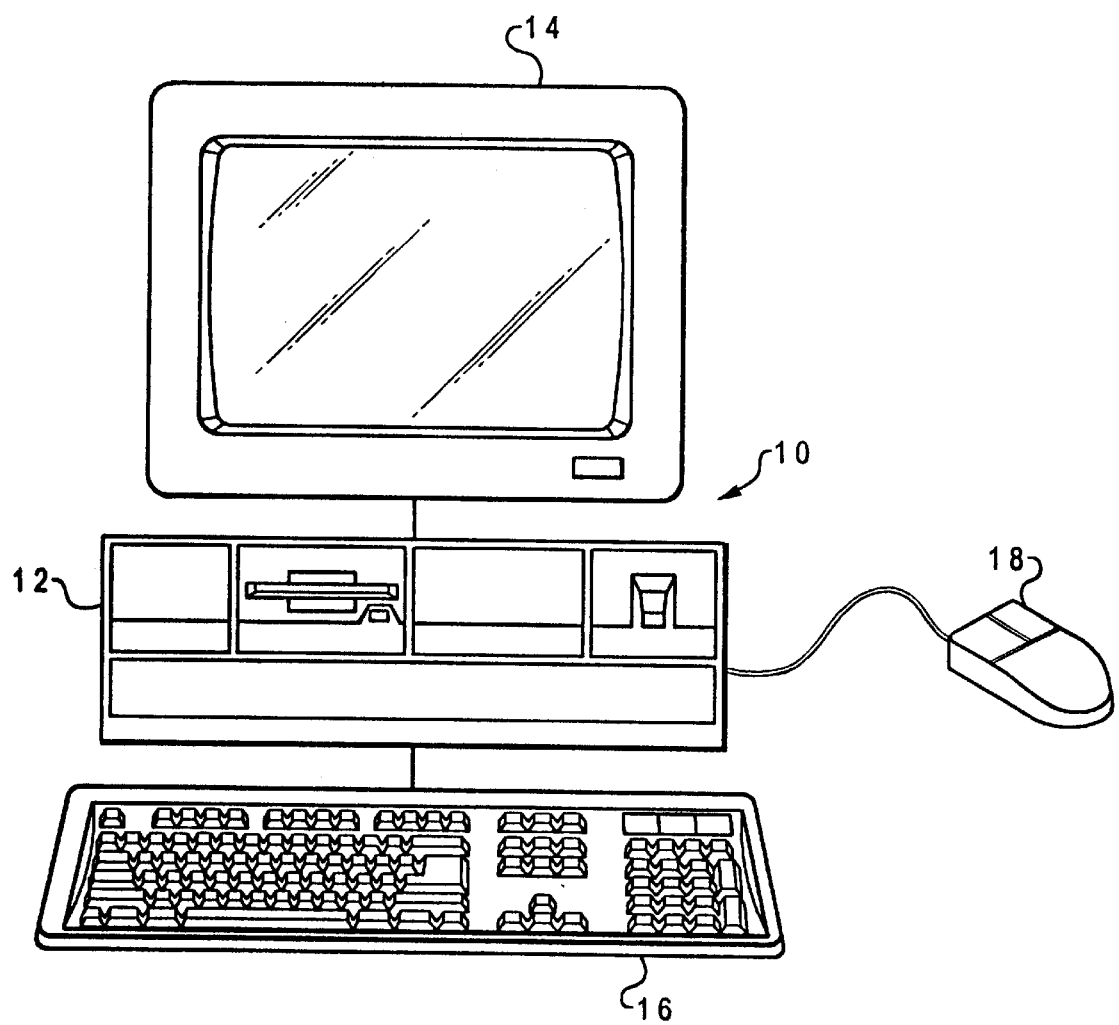
FIG. 1 is a pictorial representation of a data-processing system which can be implemented in accordance with the method and system of the present invention.

With reference now to the figures and in particular with reference to FIG. 1, there is depicted a pictorial representation of a data-processing system in which the present invention may be implemented in accordance with a preferred embodiment of the present invention. Personal computer 10, a data-processing system, is depicted in FIG. 1 and includes a system unit 12, a video-display terminal 14, an alphanumeric input device (i.e., keyboard 16) having alphanumeric and other keys, and a mouse 18. An additional input device (not shown) such as a trackball or stylus can also be included with personal computer 10. Computer 10 can be implemented utilizing any suitable computer such as an IBM Aptiva™ computer, a product of International Business Machines Corporation, located in Armonk, N.Y. "Aptiva™" is a registered trademark of International Business Machines Corporation. Although the depicted embodiment involves a personal computer, a preferred embodiment of the present invention may be implemented in other types of data-processing systems, such as, for example, intelligent workstations or mini-computers. Computer 10 also preferably includes a graphical user interface that resides within a machine-readable media to direct the operation of computer 10. Computer 10 can also be implemented utilizing any suitable computer such as the IBM RISC/6000 computer, a product of International Business Machines Corporation, located in Armonk, N.Y. "RISC SYSTEM/600™" is a trademark of International Business Machines Corporation, and can also be referred to as the "RS/6000."

Figure 2:
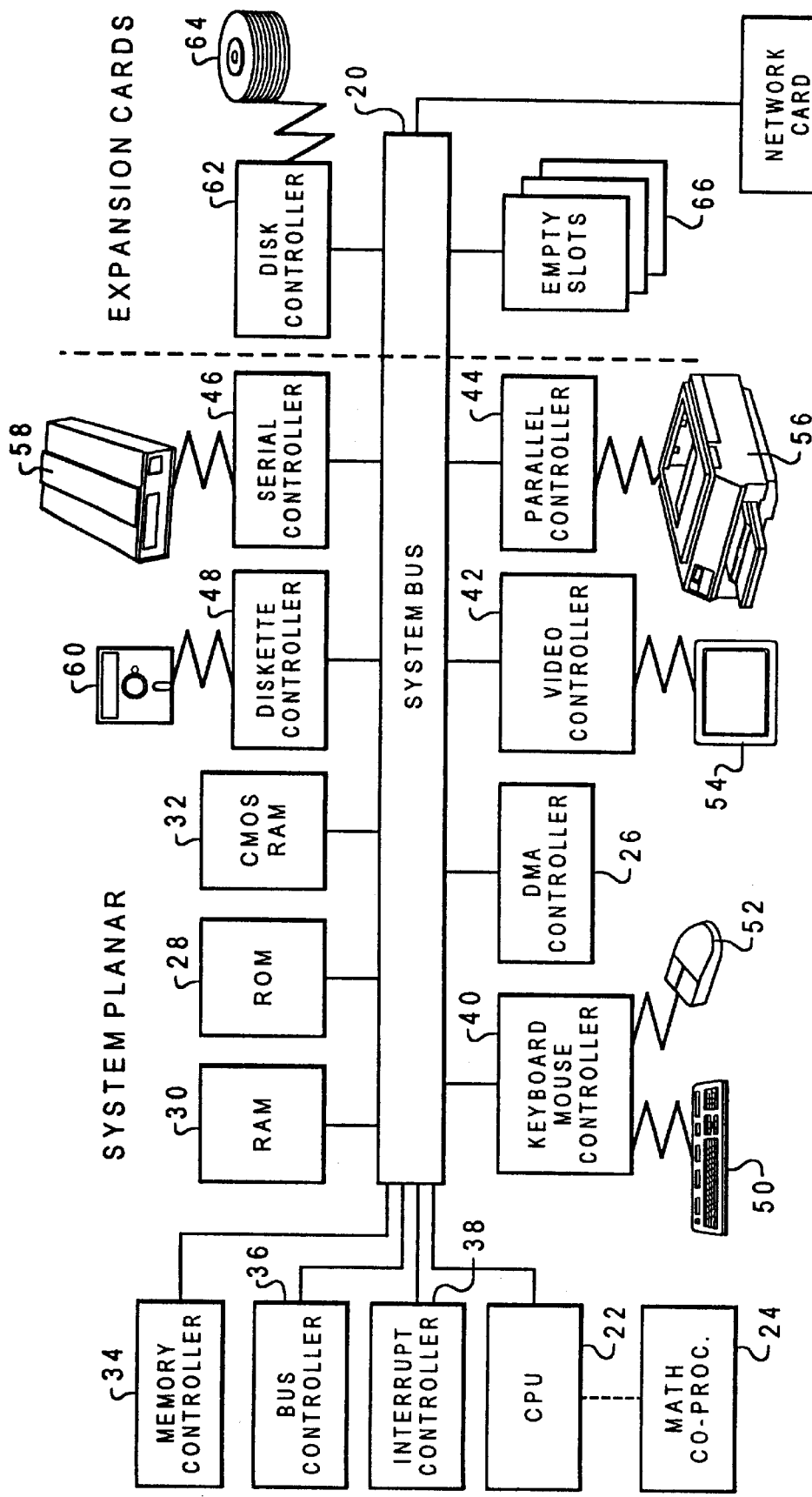
FIG. 2 depicts a block diagram illustrative of selected components in a personal computer system which can be utilized in accordance with the method and system of the present invention.

Referring now to FIG. 2 there is depicted a block diagram of selected components in personal computer 10 of FIG. 1 in which a preferred embodiment of the present invention may be implemented. Personal computer 10 of FIG. 1 preferably includes a system bus 20, as depicted in FIG. 2. System bus 20 is utilized for interconnecting and establishing communication between various components in personal computer 10. Microprocessor 22 is connected to system bus 20 and also may have numeric coprocessor 24 connected to it. Direct memory access ("DMA") controller 26 is also connected to system bus 20 and allows various devices to appropriate cycles from microprocessor 22 during large input/output ("I/O") transfers. Read-Only Memory ("ROM") 28 and Random-Access Memory ("RAM") 30 are also connected to system bus 20. ROM 28 is mapped into the microprocessor 22 address space in the range from 640K to 1 megabyte. CMOS RAM 32 is attached to system bus 20 and contains system configuration information. Any suitable machine-readable media may retain the graphical user interface of computer 10 of FIG. 1, such as RAM 30, ROM 28, a magnetic diskette, magnetic tape, or optical disk.

Also connected to system bus 20 are memory controller 34, bus controller 36, and interrupt controller 38 which serve to aid in the control of data flow through system bus 20 between various peripherals, adapters, and devices. System unit 12 of FIG. 1 also contains various I/O controllers such as those depicted in FIG. 2: keyboard and mouse controller 40, video controller, 42, parallel controller 44, serial controller 46, and diskette controller 48. Keyboard and mouse controller 40 provide a hardware interface for keyboard 50 and mouse 52. Video controller 42 provides a hardware interface for video-display terminal 54. Parallel controller 44 provides a hardware interface for devices such as printer 56. Serial controller 46 provides a hardware interface for devices such as a modem 58. Diskette controller 48 provides a hardware interface for floppy disk unit 60.

Expansion cards also may be added to system bus 20, such as disk controller 62, which provides a hardware interface for hard disk unit 64. Empty slots 66 are provided so that other peripherals, adapters, and devices may be added to system unit 12 of FIG. 1. A network card 67 additionally can be connected to system bus 20 in order to link system unit 12 of FIG. 1 to other data-processing system networks in a client/server architecture, or to groups of computers and associated devices which are connected by communications facilities. Those skilled in the art will appreciate that the hardware depicted in FIG. 2 may vary for specific applications. For example, other peripheral devices such as: optical disk media, audio adapters, or chip programming devices such as PAL or EPROM programming devices, and the like also may be utilized in addition to or in place of the hardware already depicted. Note that any or all of the above components and associated hardware may be utilized in various embodiments. However, it can be appreciated that any configuration of aforementioned system may be used for various purposes according to a particular implementation.

Figure 3:
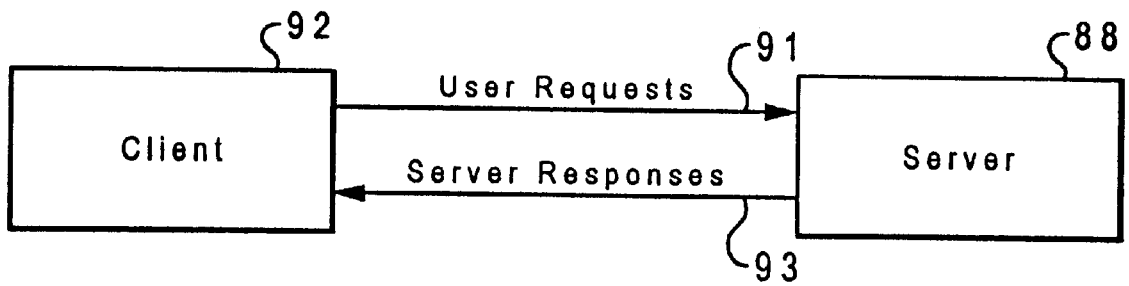
FIG. 3 illustrates a block diagram illustrative of a client/server architecture which can be utilized in accordance with the method and system of the present invention.

FIG. 3 illustrates a block diagram illustrative of a client/server architecture which can be utilized in accordance with the method and system of the present invention. In FIG. 3, user requests 91 for news are sent by a client application program 92 to a server 88. Server 88 can be a remote computer system accessible over the Internet or other communication medium. Server 88 performs scanning and searching of raw (e.g., unprocessed) information sources (e.g., newswire feeds or newsgroups) and, based upon these user requests, presents the filtered electronic information as server responses 93 to the client process. The client process may be active in a first computer system, and the server process may be active in a second computer system, and communicate with one another over a communication medium, thus providing distributed functionality and allowing multiple clients to take advantage of the information-gathering capabilities of the server.

Figure 4:
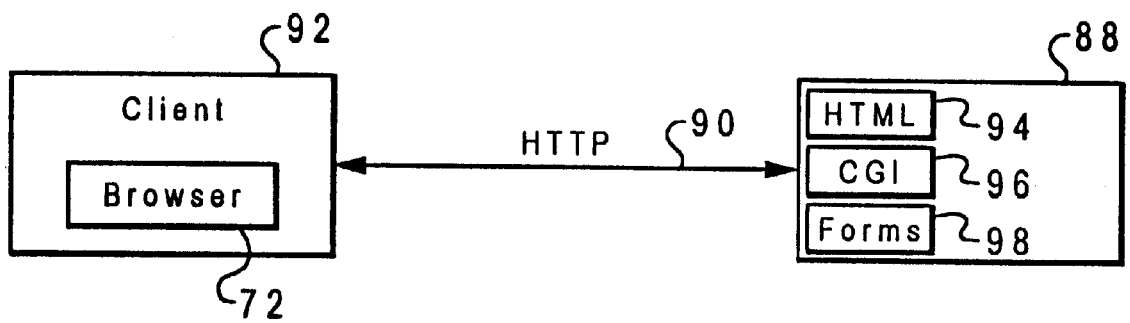
FIG. 4 depicts a detailed block diagram illustrative of a client/server architecture which can be utilized in accordance with the method and system of the present invention.

FIG. 4 illustrates a detailed block diagram of a client/server architecture which can be utilized in accordance with the method and system of the present invention. Although the client and server are processes which are operative within two computer systems, these processes being generated from a high-level programming language (e.g., PERL), which is interpreted and executed in a computer system at runtime (e.g., a workstation), it can be appreciated by one skilled in the art that they may be implemented in a variety of hardware devices, either programmed or dedicated.

Client 92 and server 88 communicate using the functionality provided by Hyper-text Transfer Protocol (HTTP). The WWW or the "web" includes all the servers adhering to this standard which are accessible to clients via Uniform Resource Locators (URLs). Active within client 92 is a first process, browser 72, which establishes the connections with server 88, and presents information to the user. Any number of commercially or publicly available browsers may be used, in various implementations, such as the Mosaic-brand browser available from the National Center for Super computing Applications (NCSA) in Urbana-Charnpaign, Illinois. Other browsers, such as the Netscape, Netcruiser, or the Lynx-brand browsers, or others which are available and provide the functionality specified under HTTP and the Mosaic browser can be utilized with the present invention. Such browsers are commonly referred to in the art as "web browsers."

Server 88 executes the corresponding server software which presents information to the client in the form of HTTP responses 90. The HTTP responses 90 correspond with the Web "pages" represented using Hyper-Text Markup Language (HTML), or other data which is generated by the server. For example, under the Mosaic brand browser, in addition to HTML functionality 94 provided by server 88 (i.e., display and retrieval of certain textual and other data based upon hyper-text views and selection of item(s)), a Common Gateway Interlace (CGI) 96 is provided which allows the client program to direct server 88 to commence execution of a specified program contained within server 88. This may include a search engine which scans received information in the server for presentation to the user controlling the client. Using this interface, and HTTP responses 90, the server may notify the client of the results of that execution upon completion.

A computer such as the aforementioned RS/6000 can include an application designed as a "Welcome Center." Thus, the RS/6000 Welcome Center, a product of International Business Machines, Inc., located in Armonk, N.Y., is designed to provide information to a new user about the system hardware, software, setup procedures, service and support offerings, and so forth. Because such an application has the potential of being distributed worldwide on a variety of RS/6000 products, rather than create a variety of Welcome Centers by country, language and user, the Welcome Center is personalized for each system and each user. Thus, a file system architecture and launch process exists which loads a unique version of the Welcome Center content each time the application is launched.

The Welcome Center file system can be structured for real-time national language support with the following subdirectory tree:

| | |
|---|---|
| /welcome | working HTML directory |
| /welcome/art | common artwork directory |
| /welcome/nls/English | language group 1 |
| /welcome/nls/Spanish | language group 2 |
| /welcome/nls/German | language group 3 |
| /welcome/nls/Japanese | language group 4 |
| /welcome/nls/Korean | language group 5 |
| /welcome/nls/generic | language group n |

Within the /welcome/nls subdirectories, the Welcome Center contains language groups for each language supported by the operating system. Since these file groups are typically very small, the space requirements are minimal and allow a Welcome Center installation image to contain all languages.

A generic version of the Welcome Center content can contain no RS/6000 system-specific information. After the language- and country-sensitive HTML source files have been loaded into the "/welcome" subdirectory, the Welcome Center launch script loads an application which senses Vital Product Data ("VPD") from the system firmware. The Welcome Center launch script contains an application which senses language and keyboard settings of each system. Such language and keyboard settings of each system can be preset during the manufacture of such systems. The application can be constructed with instructions to seek out these predetermined language and keyboard settings. When the application is launched, the HTML source files from each language group are loaded into a "main/welcome" directory. This feature allows for real-time language "personalization" of the Welcome Center content by language and country, a unique and valuable feature especially advantageous in multi-user networked environments.

Such VPD information, which is normally provided to application developers as an access key for software registration and license-tracking purposes, contains model, type, and serial number information. The Welcome Center script interprets the VPD and loads a series of personalized HTML source files from the language groups to personalize the content further with model-specific information. This information typically contains unique model information, capabilities of the system and standard feature listings. Although not a necessary limitation of the present invention, the language and keyboard settings can optionally be contained within the VPD such that the application which senses language and keyboard settings of each system can search the VPD directly for such information.

Figure 5:
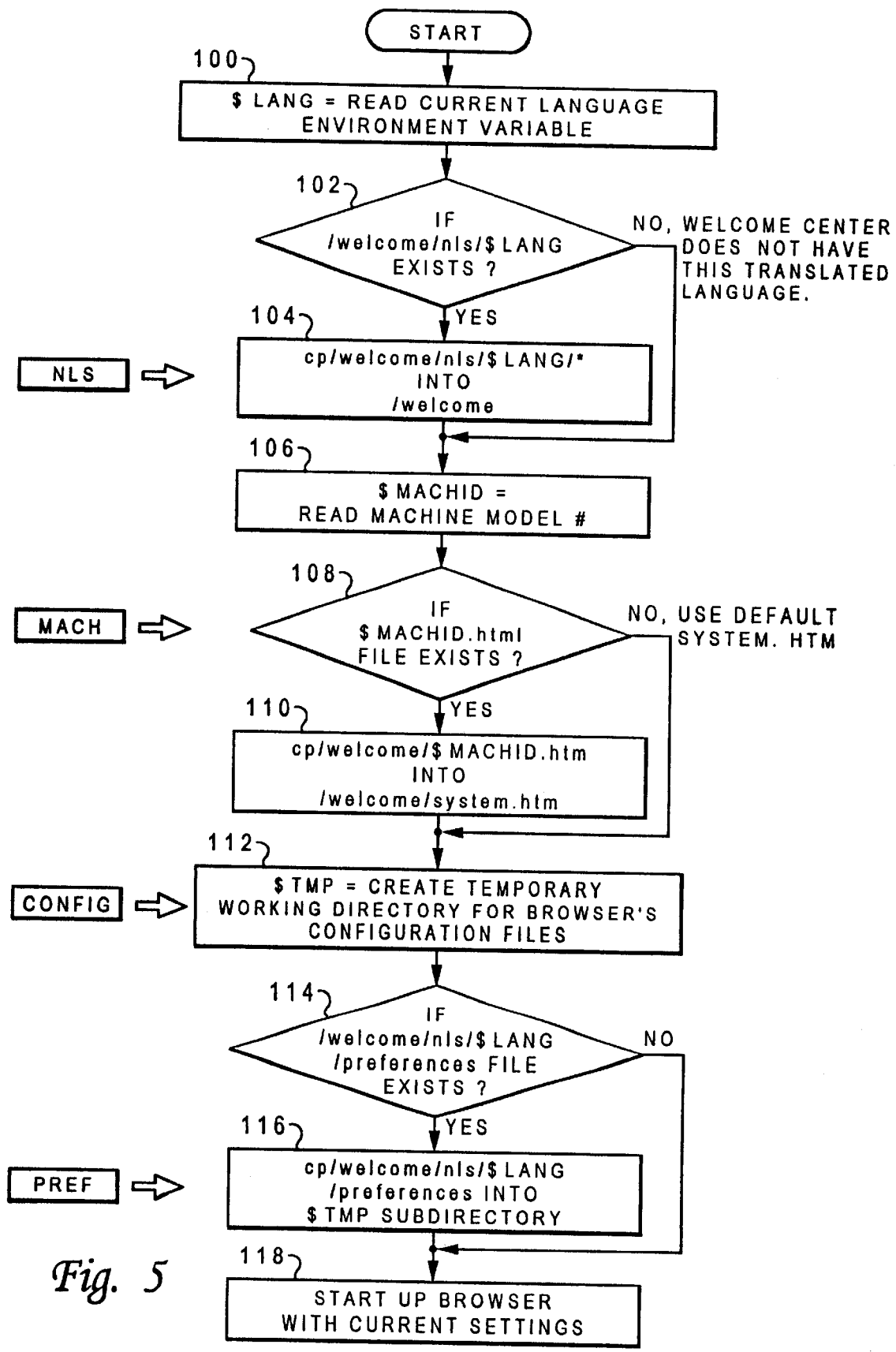
FIG. 5 is a flowchart of operations for a method and system for providing real-time personalization for web-browser-based applications which can be utilized in accordance with the method and system of the present invention.

FIG. 5 is a flowchart of operations for a method and system for providing real-time personalization for web-browser-based applications which can be utilized in accordance with the method and system of the present invention. As depicted at block 100, a current language environment variable is read from an input source maintained within a data-processing system. "Reading" is the means by which a data processing system such as computer 10 depicted in FIG. 1 receives information, typically from an input source such as a disk drive or other memory storage. The operation in which the current language environment variable is actually read from an input source contained with the data-processing system is represented by the word $LANG. The current language environment variable is a variable which indicates the initial human language under which the data-processing system operates. The current language environment variable can be located in a memory of the data-processing system.

The flow chart of operations depicted in FIG. 5 utilizes a national language support directory which includes a variety of human language groups. This national language support directory is indicated by the phrase "NLS." As illustrated at block 102, if the current language environment variable does not exist (i.e. the national language support directory does not provide support for the current language environment variable), then, as depicted at block 106, the flow chart of operations continues and specific machine model information is read by the data-processing system from an input source or other memory storage maintained by the data-processing system. If, however, support is provided by the national language support directory for the current language environment variable, then as described at block 104, this national language support directory is placed into a governing "welcome" directory which includes the national language support directory. The block containing the word "NLS" indicates that a national language support directory for the Welcome Center exists, including support for the current language environment variable. If the current language environment variable does not include support for the current language environment variable, then as depicted at block 106, machine model information is read. As depicted at block 108, if machine model HTML information file exists, then, as depicted at block 110, this information is placed into the Welcome Center for utilization by a user of the particular language provided by language subdirectories contained within the national language support directory.

Figure 6:
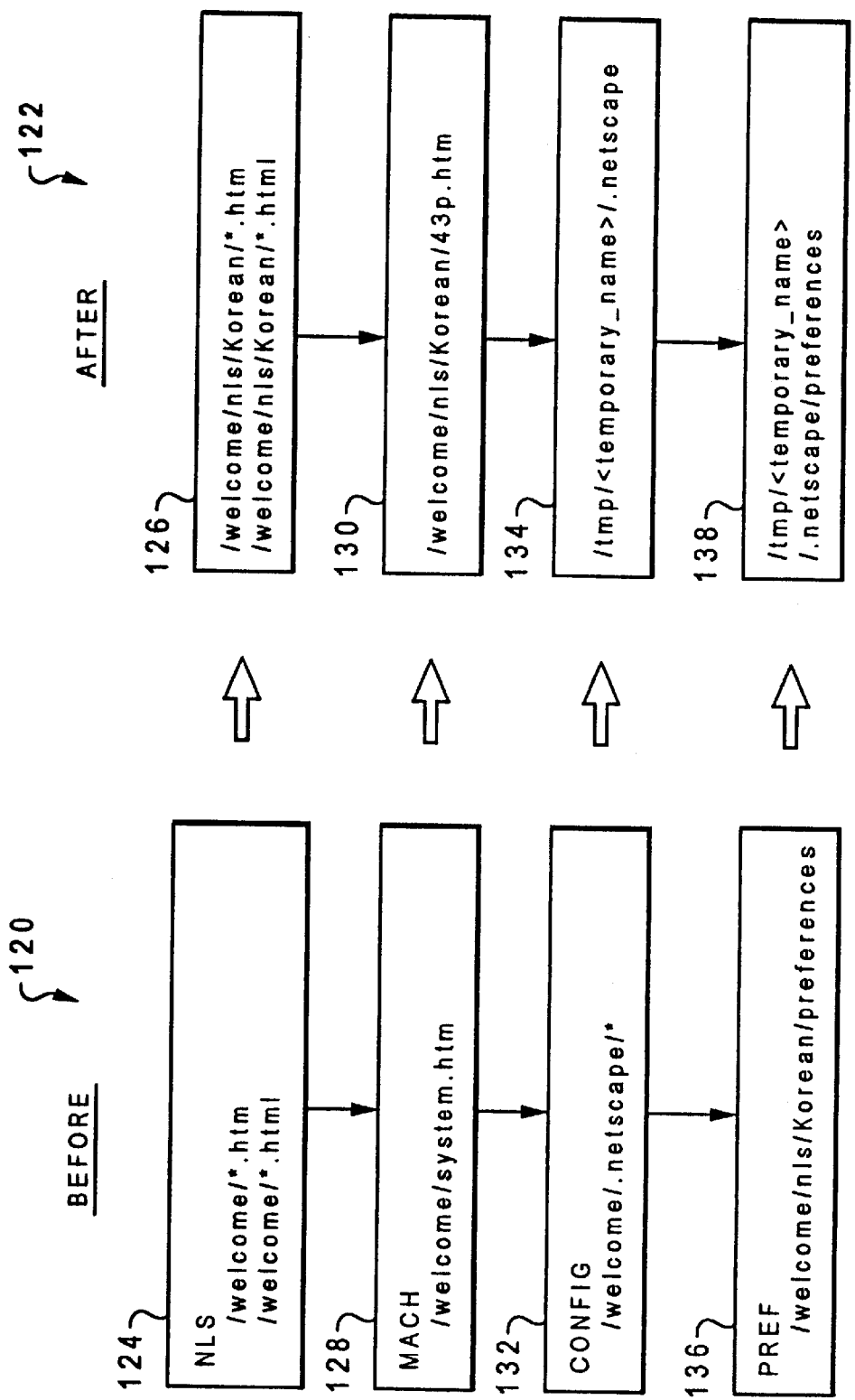
FIG. 6 is a high-level flow diagram illustrated operations in a method and system for providing real-time personalization for web-browser-based applications which can be utilized in accordance with the method and system of the present invention.

The operation determining whether or not the machine model HTNL information file exists is indicated by the word "MACH" in FIG. 5 and FIG. 6 herein. The configuration operation is indicated by the word "CONFIG" in FIG. 5 and FIG. 6 herein.

If such information does not exist, default information is instead utilized by the Welcome Center. As described at block 112, a temporary working directory for the browsers's configuration files is designated. Language preferences are indicated by the word "PREF" in FIG. 5 and FIG. 6 herein. Thereafter, as illustrated at block 114, if a language preference group exists, then, as depicted at block 116, this language preference group is loaded into a temporary $TMP subdirectory. Finally, as illustrated at block 118, a particular browser is started with the current settings determined in the previous logical operations. The aforementioned logical operations can be implemented in a data-processing system such as computer 10 of FIG. 1 and FIG. 2.

FIG. 6 depicts a high-level flow diagram illustrating operations in a method and system for providing real-time personalization for web-browser-based applications which can be utilized in accordance with the method and system of the present invention. In FIG. 6, a "before" and "after" comparison is presented based on the example of an implementation of an NLS Korean language subdirectory for a particular browser such as Netscape running on the IBM RS/6000 43P computer. Netscape™ is a trademark of Netscape, Inc. As depicted at block 124, general English language HTML files are initially available. Following an operation for implementing NLS, as depicted at block 126, the file names remain the same but have instead been overwritten by the NLS Korean language subdirectory. These are now Korean language HTML files.

As illustrated at block 128, the operation determining whether or not the machine model HTML information file exists is indicated by the word MACH. As a result, the file "/welcome/system.html" contains a list of the RS/6000 systems. However, as indicated at block 130, the file now contains a Korean language HTML page describing the IBM RS/6000 43P. As described at block 132, the browser configuration files are stored in the Welcome Center Directory. As illustrated at block 134, a new subdirectory now contains all of the files in /welcomel.netscape. As depicted at block 136, the specific Korean preferences are loaded. As depicted at block 138, this file now contains the Korean version of the preferences file which indicates the appropriate language encoding. Note that this is in English with many different variables and their settings.

While the invention has been particularly shown as described with reference to a preferred embodiment, it will be understood by those skilled in the art that various changes in form and detail may be made therein without departing from the spirit and scope of the invention.

What is claimed is:

1. A method in a data-processing system for personalizing standard data-processing applications for utilization by diverse data-processing application users, comprising the steps of:

storing within a national language support directory within said data-processing system, data which includes a plurality of human language files;

automatically sensing a human language preset during manufacture of said data processing system;

automatically detecting the presence of said plurality of human language files within said national language support directory in response to loading general system data into a working directory, wherein at least one human language file among said plurality of human language files corresponds to said preset human language setting for said data-processing system;

loading into said working directory from said national language support directory said at least one human language file from among said plurality of human language files which corresponds to said preset human language setting; and thereafter, configuring said general system data with said at least one human language file such that said general system data is personalized to correspond to said preset human language setting.

2. The method of claim 1 wherein the step of storing within a national language support directory within said data-processing system, data which includes a plurality of human language files, further comprises the step of:

storing within a national language support directory within said data-processing system, data comprising hyper-text data wherein said data includes a plurality of human language files.

3. A system for personalizing standard data-processing applications for utilization by diverse data-processing application users, comprising:

storage means for storing within a national language support directory within a data-processing system, data which includes a plurality of human language files;

means for automatically sensing a human language preset during manufacture of said data processing system;

means for automatically detecting the presence of said plurality of human language files within said national language support directory in response to loading general system data into a working directory, wherein at least one human language file among said plurality of human language files corresponds to said preset human language setting for said data-processing system;

means for loading into said working directory from said national language support directory said at least one human language file from among said plurality of human language files which corresponds to said preset human language setting; and means, thereafter, for configuring said general system data with said at least one human language file such that said general system data is personalized to correspond to said preset human language setting.

4. The system of claim 3 wherein said data her comprises hyper-text data.

5. A computer program product residing in computer memory in a data-processing system for personalizing standard data-processing applications for utilization by diverse data-processing application users, comprising:

storage means for storing within a national language support directory within a data-processing system, data which includes a plurality of human language files;

means for automatically sensing a human language preset during manufacture of said data processing system;

means for automatically detecting the presence of said plurality of human language files within said national language support directory in response to loading general system data into a working directory, wherein at least one human language file among said plurality of human language files corresponds to said preset human language setting for said data-processing system;

means for loading into said working directory from said national language support directory said at least one human language file from among said plurality of human language files which corresponds to said preset human language setting; and means, thereafter, for configuring said general system data with said at least one human language file such that said general system data is personalized to correspond to said preset human language setting.

6. The computer program product of claim 5 wherein said data further comprises hyper-text data.

\* \* \* \* \*

UNITED STATES PATENT AND TRADEMARK OFFICE
CERTIFICATE OF CORRECTION

PATENT NO.    : 6,381,567 B1
DATED         : April 30, 2002
INVENTOR(S)   : Christensen et al.

It is certified that error appears in the above-identified patent and that said Letters Patent is hereby corrected as shown below:

Column 8,
Line 30, please delete "HTNL" and add -- HTML --;

Column 10,
Line 22, please delete "her" and add -- further --.

Signed and Sealed this

Twelfth Day of August, 2003

JAMES E. ROGAN
*Director of the United States Patent and Trademark Office*